United States Patent
Dobashi et al.

(10) Patent No.: US 12,344,256 B2
(45) Date of Patent: Jul. 1, 2025

(54) VEHICLE CONTROL DEVICE

(71) Applicant: TOYOTA JIDOSHA KABUSHIKI KAISHA, Toyota (JP)

(72) Inventors: Kohei Dobashi, Susono (JP); Satoshi Yamanaka, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/297,348

(22) Filed: Apr. 7, 2023

(65) Prior Publication Data
US 2023/0365140 A1 Nov. 16, 2023

(30) Foreign Application Priority Data
May 10, 2022 (JP) ................................. 2022-077802

(51) Int. Cl.
*B60W 40/09* (2012.01)
*B60W 60/00* (2020.01)

(52) U.S. Cl.
CPC ............ *B60W 40/09* (2013.01); *B60W 60/00* (2020.02); *B60W 2540/01* (2020.02); *B60W 2540/22* (2013.01)

(58) Field of Classification Search
CPC .. B60W 40/09; B60W 60/00; B60W 2540/01; B60W 2540/22
See application file for complete search history.

(56) References Cited

U.S. PATENT DOCUMENTS

| | | | |
|---|---|---|---|
| 2018/0052458 A1 | 2/2018 | Tsuji et al. | |
| 2018/0113461 A1* | 4/2018 | Potnis | B60W 60/0053 |
| 2020/0122724 A1 | 4/2020 | Hiramatsu | |
| 2020/0307611 A1 | 10/2020 | Goto | |
| 2022/0153300 A1* | 5/2022 | Kwatra | G01C 21/3484 |

FOREIGN PATENT DOCUMENTS

| | | |
|---|---|---|
| JP | 2012-059274 A | 3/2012 |
| JP | 2020-086801 A | 6/2020 |
| JP | 2020-157820 A | 10/2020 |
| WO | 2016/170785 A1 | 10/2016 |
| WO | 2018/163288 A1 | 9/2018 |
| WO | 2018/193536 A1 | 10/2018 |

* cited by examiner

*Primary Examiner* — Todd Melton
*Assistant Examiner* — Oliver Tan
(74) *Attorney, Agent, or Firm* — Sughrue Mion, PLLC

(57) ABSTRACT

A vehicle control device for controlling a vehicle, the vehicle control device being configured to switch between automatic driving and manual driving of the vehicle, learn driving characteristics during the manual driving, and reflect a learned value of the driving characteristics in control during the automatic driving. Further, the vehicle control device controls the vehicle in a manner that, in the learned value of the driving characteristics, a state of an occupant other than a driver during the manual driving is in association with the driving characteristics.

3 Claims, 6 Drawing Sheets

| ITEM OF DRIVING CHARACTERISTIC | FIRST LEVEL ▼ STEEP | SECOND LEVEL ▼ | THIRD LEVEL ▼ SLOW |
|---|---|---|---|
| ACCELERATION/DECELERATION | ☆ | | ★ |
| CRUISING SPEED | | ☆ ★ | |
| INTER-VEHICLE DISTANCE DURING FOLLOW-UP TRAVELING | ☆ | | ★ |
| INTER-VEHICLE DISTANCE AT STOP | ☆ | | ★ |

☆ : FIRST DRIVING CHARACTERISTIC
★ : SECOND DRIVING CHARACTERISTIC

| ITEM OF DRIVING CHARACTERISTIC | FIRST LEVEL ▼ SECOND LEVEL ▼ THIRD LEVEL ▼ STEEP ←——————→ SLOW | | |
|---|---|---|---|
| ACCELERATION/DECELERATION | ☆ | | ★ |
| CRUISING SPEED | | ★ | |
| INTER-VEHICLE DISTANCE DURING FOLLOW-UP TRAVELING | ☆ | | ★ |
| INTER-VEHICLE DISTANCE AT STOP | ☆ | | ★ |

☆ : FIRST DRIVING CHARACTERISTIC
★ : SECOND DRIVING CHARACTERISTIC

VEHICLE CONTROL DEVICE

CROSS-REFERENCE TO RELATED APPLICATION(S)

The present application claims priority to and incorporates by reference the entire contents of Japanese Patent Application No. 2022-077802 filed in Japan on May 10, 2022.

BACKGROUND

The present disclosure relates to a vehicle control device.

A technology of learning a driving operation of a driver during manual driving and applying a result of the learning to traveling control of automatic driving in a vehicle that can be switched between the manual driving and the automatic driving is disclosed in WO 2018/193536 A.

The present invention has been made in view of the above problems, and an object thereof is to provide a vehicle control device capable of performing automatic driving that is comfortable for occupants other than a driver.

SUMMARY

There is a need for providing a vehicle control device capable of performing the automatic driving comfortable for an occupant other than a driver.

According to an embodiment, there is provided a vehicle control device for controlling a vehicle, the vehicle control device being configured to switch between automatic driving and manual driving of the vehicle, learn driving characteristics during the manual driving, and reflect a learned value of the driving characteristics in control during the automatic driving. Further, the vehicle control device controls the vehicle in a manner that, in the learned value of the driving characteristics, a state of an occupant other than a driver during the manual driving is in association with the driving characteristics.

DETAILED DESCRIPTION

In the technology disclosed in WO 2018/193536 A, since a state of an occupant who is other than a driver and seated on a back seat or the like is not considered, in a case where a ratio of learning of a driving operation during manual driving of the driver which driving operation is not comfortable for the occupant other than the driver is high, there is a possibility that ride quality during automatic driving is deteriorated for the occupant other than the driver in a case where a result of the learning is applied to traveling control of the automatic driving.

In the following, embodiments of a vehicle control device according to the present disclosure will be described. Note that the present disclosure is not limited to the present embodiments.

Figure 1:
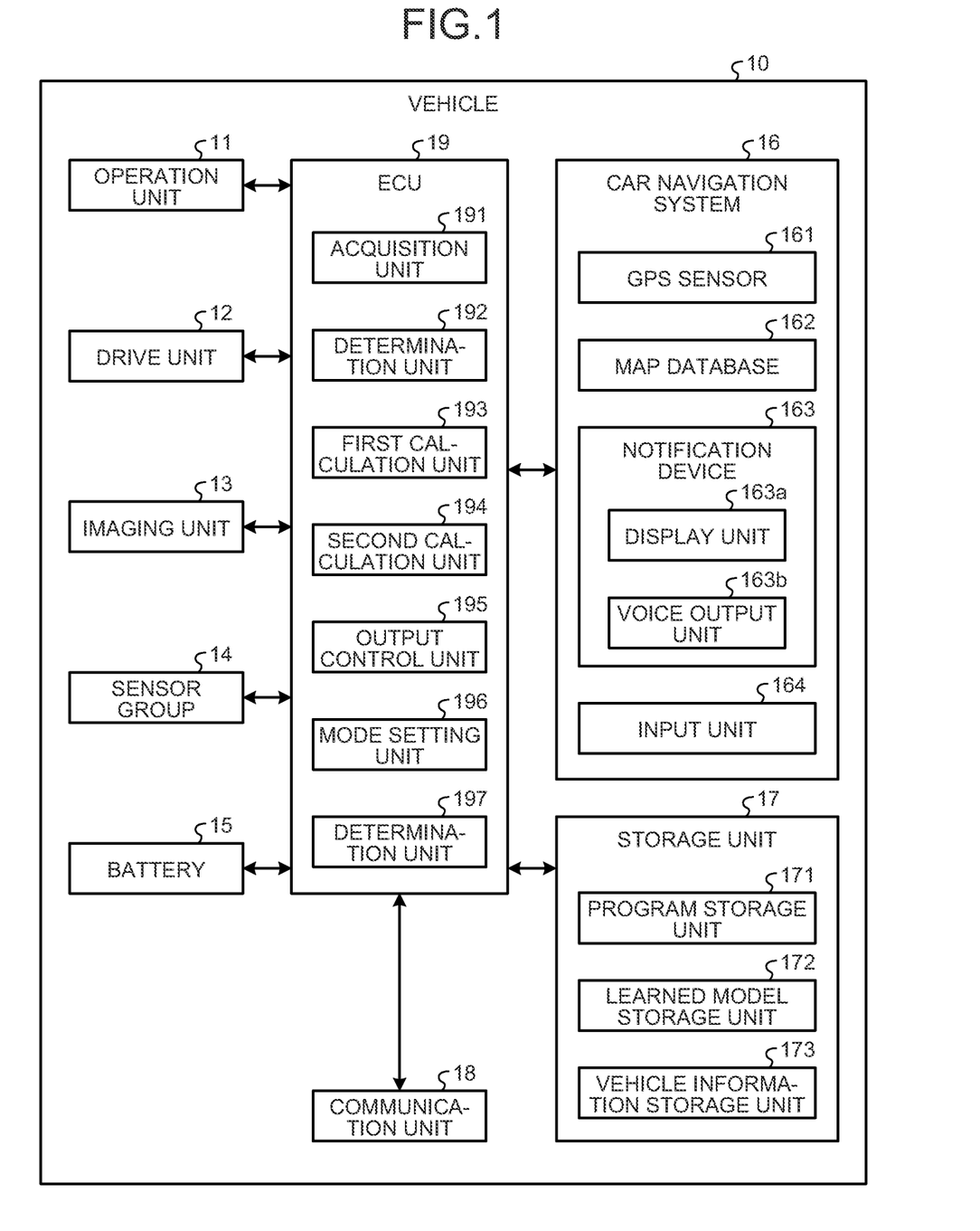
FIG. 1 is a block diagram illustrating a functional configuration of a vehicle according to an embodiment.

FIG. 1 is a block diagram illustrating a functional configuration of a vehicle 10 according to an embodiment.

The vehicle 10 illustrated in FIG. 1 includes an operation unit 11, a drive unit 12, an imaging unit 13, a sensor group 14, a battery 15, a car navigation system 16, a storage unit 17, a communication unit 18, and an electronic control unit (ECU) 19. Furthermore, although a battery electric vehicle (BEV) capable of autonomously traveling will be described as the vehicle 10 in the following, this is not a limitation. Furthermore, the vehicle 10 can automatically move toward a destination under the control by a center server or the ECU 19. Obviously, the vehicle 10 can also move toward a destination desired by a user when the user such as a driver who uses the vehicle or a passenger or the like on board operates a steering or the like.

The operation unit 11 includes a steering wheel, an accelerator pedal, a brake pedal, and the like. The operation unit 11 receives an operation by a driver (driver) who is on the vehicle 10 or an occupant (passenger) other than the driver.

The drive unit 12 includes a motor or the like. Under the control by the ECU 19, the drive unit 12 supplies driving force to driving wheels of the vehicle 10 on the basis of electric power supplied from the battery 15.

The imaging unit 13 includes an imaging device including one or a plurality of lenses, and a charge coupled device (CCD) image sensor, a complementary metal oxide semiconductor (CMOS) image sensor, or the like that captures a subject image collected by the lenses. A plurality of the imaging units 13 is arranged outside the vehicle 10 and inside the vehicle 10. For example, in a case of being arranged in the vehicle 10, the imaging units 13 are arranged near an entrance of the vehicle 10, near an exit of the vehicle 10, near a seat of the vehicle 10, and near a driver seat of the vehicle 10. Furthermore, in a case of being arranged outside the vehicle 10, the imaging units 13 are arranged on each of a front side, a rear side, and a side of the vehicle 10. The imaging unit 13 performs imaging and outputs image data acquired by the imaging to the ECU 19 under the control by the ECU 19.

The sensor group 14 includes a sensor to realize automatic driving and a sensor to detect a remaining amount of the battery 15. Specifically, the sensor group 14 includes a 3D-LiDAR, a millimeter wave sensor, an infrared sensor, a vehicle speed sensor, an angular velocity sensor, a gyro sensor, an acceleration sensor, and the like. Furthermore, the sensor group 14 includes a sensor to detect an operation or the like by the driver on the operation unit 11, and includes, for example, an accelerator pedal sensor, a brake pedal sensor, a steering sensor, a seating sensor, a seat belt sensor, and the like. In addition, the sensor group 14 includes a tester that detects each of a remaining amount (SOC), a temperature, a state of health (SOH), a voltage value, and a current value of the battery 15, a temperature sensor, and the like. The sensor group 14 outputs various detected detection results to the ECU 19.

The battery 15 includes, for example, a rechargeable secondary battery such as a nickel-metal hydride battery or a lithium ion battery. The battery 15 stores high-voltage DC power to drive the vehicle 10. The battery 15 is electrically connectable to a charging device 30 via a charging port (not illustrated), and is charged with external electric power supplied from the charging device 30.

The car navigation system 16 includes a global positioning system (GPS) sensor 161, a map database 162, a notification device 163, and an input unit 164.

The GPS sensor 161 receives signals from a plurality of GPS satellites or transmission antennas, and calculates a position (longitude and latitude) of the vehicle 10 on the basis of the received signals. The GPS sensor 161 includes a GPS reception sensor or the like. Note that direction accuracy of the vehicle 10 may be improved by mounting of a plurality of the GPS sensors 161 in the present embodiment.

The map database 162 stores various kinds of map data. The map database 162 includes a storage medium such as a hard disk drive (HDD) or a solid state drive (SSD).

The notification device 163 includes a display unit 163a that displays an image, a map, a video, and character information, and a voice output unit 163b that generates sound such as voice or a warning sound. The display unit 163a includes a displaying display of liquid crystal, organic electro luminescence (EL), or the like. The voice output unit 163b includes a speaker or the like.

The input unit 164 receives an operation input, a voice input, and the like by the user, and outputs signals corresponding to received various operation contents to the ECU 19. The input unit 164 is realized by utilization of a touch panel, a button, a switch, a jog dial, a microphone, and the like.

By superimposing a current position of the vehicle 10 which position is acquired by the GPS sensor 161 on a map corresponding to the map data stored in the map database 162, the car navigation system 16 configured in such a manner notifies the user of information including a current traveling road of the vehicle 10, a traveling route to a target destination, and the like by the display unit 163a and the voice output unit 163b.

The storage unit 17 stores various kinds of information related to the vehicle 10. The vehicle information includes identification information (such as a vehicle ID) identifying the vehicle 10, a vehicle type of the vehicle 10, fuel consumption information, and the like. In addition, the storage unit 17 stores CAN data, and the like of the vehicle 10 which data is input from the ECU 19, various programs executed by the ECU 19, and the like. The storage unit 17 includes a dynamic random access memory (DRAM), a read only memory (ROM), a flash memory, a hard disk drive (HDD), a solid state drive (SSD), or the like. In addition, the storage unit 17 includes a program storage unit 171 executed by the vehicle 10, a learned model storage unit 172 that stores a learned model used when the ECU 19 calculates a power consumption amount and a cruisable distance, a learned model used when the ECU 19 calculates driving characteristics during manual driving, and the like, and a vehicle information storage unit 173 that stores the vehicle information identifying the vehicle 10. Here, the learned model is formed by utilization of a deep neural network (DNN) as machine learning, for example. Note that although a kind of a network of the DNN is not being specifically limited, it is sufficient when learning is performed in the following manner. That is, training data or learning data in which a state of the occupant other than the driver during the manual driving and driving characteristics during the manual driving are associated with each other is prepared, the training data or the learning data is input to a calculation model based on a multilayer neural network, and the learning is performed, for example. It is sufficient that training data or learning data in which a vehicle type, fuel consumption, a speed, and a distance of the vehicle 10 and power consumption of the vehicle 10 are associated with each other is prepared, the training data or the learning data is input to the calculation model based on the multilayer neural network, and the learning is performed. Furthermore, as a machine learning method, for example, a method based on the DNN of a multilayer neural network, such as convolutional neural network (CNN), 3D-CNN, or the like may be used.

Under the control by the ECU 19, the communication unit 18 transmits various kinds of data and the like to the center server through a network NW and receives the various kinds of data from the center server. For example, under the control by the ECU 19, the communication unit 18 acquires traffic information from the center server and outputs the acquired traffic information to the ECU 19. The communication unit 18 includes a communication module or the like capable of transmitting and receiving various kinds of information.

The ECU 19 includes a memory, a processor having hardware such as a central processing unit (CPU). The ECU 19 controls each unit of the vehicle 10. For example, in a case where a driving mode of the vehicle 10 is set to an automatic driving mode, the ECU 19 causes the vehicle 10 to autonomously travel by controlling the drive unit 12 by using a result of the detection by the sensor group 14, and the like. The ECU 19 includes an acquisition unit 191, a determination unit 192, a first calculation unit 193, a second calculation unit 194, an output control unit 195, a mode setting unit 196, and a determination unit 197. Note that the ECU 19 functions as a control device in the present embodiment.

The acquisition unit 191 acquires a destination and a current position of the vehicle 10. Specifically, the acquisition unit 191 acquires a destination of the vehicle 10 which destination is input by the driver or the occupant other than the driver via the input unit 164, and acquires a current position of the vehicle 10 via the GPS sensor 161 and the map database 162.

The determination unit 192 determines a traveling route by selecting one from a plurality of traveling routes on the basis of the destination of the vehicle 10, the current position of the vehicle 10, and the map database 162. Specifically, the determination unit 192 selects the traveling route in which a distance between the destination and the current position of the vehicle 10 is the shortest from the plurality of traveling routes, and determines the traveling route.

The first calculation unit 193 calculates power consumption acquired by prediction of an amount of electric power consumed by the battery 15 on the traveling route from the current position to the destination for each of the automatic driving mode and the manual driving mode on the basis of the destination of the vehicle 10 and the current position of the vehicle 10. Specifically, by using the learned model stored in the learned model storage unit 172, the first calculation unit 193 performs the calculation by inputting, as input data, a distance, a grade, and presence or absence of congestion on the traveling route from the current position to the destination, and outputting the power consumption as the output data. In addition, the first calculation unit 193 calculates the cruisable distance of the vehicle 10 in each of the automatic driving mode and the manual driving mode on the basis of the current remaining amount of the battery 15 and the calculated predicted power consumption. Specifically, the first calculation unit 193 calculates the cruisable distance in each of the automatic driving mode and the manual driving mode on the basis of the current remaining amount of the battery 15 which amount is acquired via the sensor group 14, the calculated predicted power consumption, the distance of the traveling route determined by the determination unit 192, the grade of the traveling route, the presence or absence of congestion on the travel route, and a charging position (such as a charging station) of the charging device which charging position is installed on the traveling route.

The second calculation unit 194 uses the learned model stored in the learned model storage unit 172 of the storage unit 17, and learns the driving characteristics during the manual driving on the basis of learning data or the like in which the state of the occupant other than the driver during the manual driving is associated with the driving characteristics during the manual driving. Then, the second calculation unit 194 outputs the learned value and causes the storage unit 17 to store the value.

The output control unit 195 outputs at least one of the predicted power consumption of each of the automatic driving mode and the manual driving mode and the cruisable distance of each of the automatic driving mode and the manual driving mode which power consumption and cruisable distance are calculated by the first calculation unit 193. Specifically, the output control unit 195 causes the display unit 163a to display at least one of the predicted power consumption and the cruisable distance of each of the automatic driving mode and the manual driving mode. Furthermore, in a case where the determination unit 197 determines that the congestion is generated on the traveling route on which the vehicle 10 travels, the output control unit 195 outputs at least one of the predicted power consumption of each of the automatic driving mode and the manual driving mode and the cruisable distance of each of the automatic driving mode and the manual driving mode which power consumption and cruisable distance are calculated by the first calculation unit 193.

The mode setting unit 196 sets the driving mode of the vehicle 10 to the automatic driving mode or the manual driving mode, or sets a drive mode (such as comfort, normal, or sporty) according to an operation by the driver or the occupant other than the driver with respect to the input unit 164.

On the basis of the traffic information acquired by the acquisition unit 191, the determination unit 197 determines whether the congestion is generated on the traveling route on which the vehicle 10 is traveling. Furthermore, the determination unit 197 determines a state inside the vehicle, a psychological state of the driver, and the like on the basis of a result of the detection by the sensor group 14.

In the vehicle 10 according to the embodiment, states of the manual driving are classified from a viewpoint of a state of the vehicle 10 (such as presence or absence of the occupant other than the driver) and the psychological state (such as being in hurry or relaxed), and driving characteristics corresponding to each state of the manual driving is learned and stored. Then, during the automatic driving, a corresponding manual driving-based characteristics is applied from the classifications as driving characteristics for the automatic driving. This makes it possible to realize smooth automatic driving that concerns the occupant while reflecting preference of the driver in the driving.

Note that examples of items of the driving characteristics include items that concern the occupant other than the driver, such as "acceleration and jerk during acceleration/deceleration", an "acceleration/deceleration start timing", an "inter-vehicle distance during follow-up traveling", an "inter-vehicle distance at a stop", "longitudinal acceleration in starting", a "corner entry vehicle speed", "lateral acceleration at a corner", a "track at a corner", "lateral acceleration at the time of lane change", and a "cruising vehicle speed".

In addition, as the in-vehicle state for which the manual driving-based characteristics is to be individually stored, there is the presence or absence of the occupant other than the driver. For example, a state in the vehicle where only the driver is present is set as a first in-vehicle state, and a state in the vehicle where the occupant other than the driver is present is set as a second in-vehicle state. As compared with first driving characteristics that is a learned value of a driving characteristics learned in the first in-vehicle state during the manual driving, second driving characteristics that is a learned value of driving characteristics learned in the second in-vehicle state during the manual driving is slow (dull) driving characteristics that cares for the occupant.

In the vehicle 10 according to the embodiment, in a case of the manual driving, as the state of the occupant other than the driver, each of the first driving characteristics and the second driving characteristics is calculated and stored as the manual driving-based characteristics on the basis of, for example, the in-vehicle state (presence or absence of the occupant other than the driver, seated or standing, and orientation of the occupant). Furthermore, in a case of the automatic driving, it is determined whether it is set to utilize the manual driving-based characteristics (first driving characteristics and second driving characteristics). In a case where the manual driving-based characteristics are utilized, the first driving characteristics or the second driving characteristics are applied as the driving characteristics of the automatic driving on the basis of the psychological state of the occupant. Note that in a case where the manual driving-based characteristics are utilized and distinction based on the psychological state of the occupant is not performed, the second driving characteristics may be applied as the driving characteristics during the automatic driving. During the automatic driving, there is a case where movement expected by the driver and movement of the vehicle do not match. Thus, a body of the driver during the automatic driving is likely to be oscillated similarly to the occupant other than the driver during the manual driving. Thus, the second driving characteristics that is the manual driving-based characteristics learned in the second in-vehicle state may be applied as normal driving characteristics during the automatic driving. On the other hand, in a case where the occupant requests more aggressive automatic driving than the normal driving characteristics (second driving characteristics) during the automatic driving, the first driving characteristics steeper than the second driving characteristics may be applied to the driving characteristics during the automatic driving. Note that to detect whether the occupant requests the aggressive automatic driving, for example, information that indicates being in hurry, relaxed, or the like and that is read from a face, conversation, or the like of the occupant by the sensor group 14 or the input unit 164, the selected drive mode (such as comfort, normal, or sporty), or the like may be used as the information related to the psychological state of the occupant.

Figure 2:
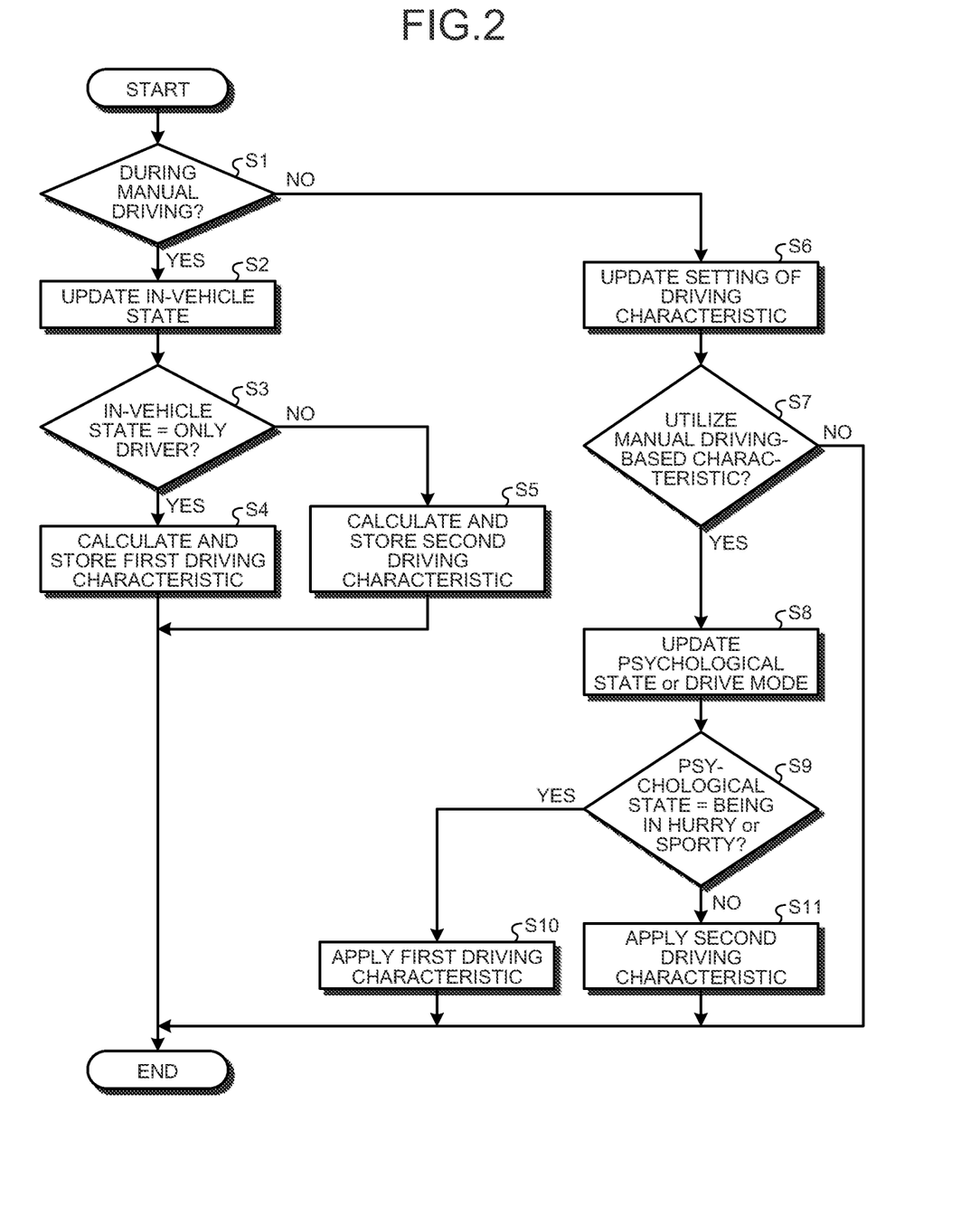
FIG. 2 is a flowchart illustrating a first example of control performed by an ECU.
Figure 3:
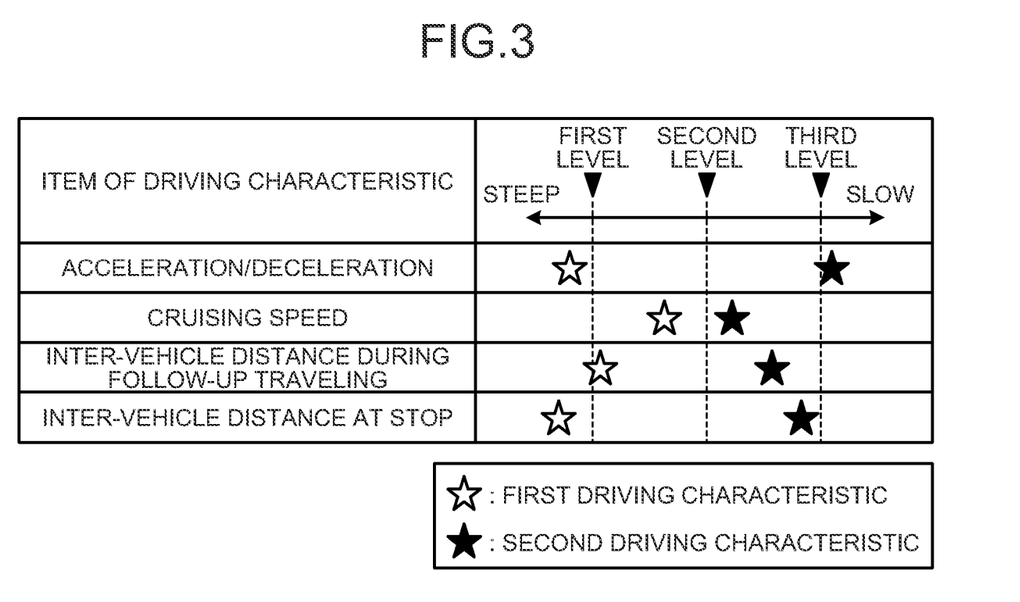
FIG. 3 is a view illustrating an example of degrees of steepness and slowness for each of various items in a first driving characteristics and a second driving characteristics.

FIG. 2 is a flowchart illustrating a first example of control performed by the ECU 19. Note that a control flow illustrated in FIG. 2 is repeatedly executed every several milliseconds, for example. FIG. 3 is a view illustrating an example of degrees of steepness and slowness for each of various items in the first driving characteristics and the second driving characteristics.

First, the ECU 19 determines whether the manual driving is being performed (Step S1). In a case of determining that the manual driving is being performed (Yes in Step S1), the ECU 19 updates a state inside the vehicle (Step S2). Then, the ECU 19 determines whether an in-vehicle state indicates that only a driver is satisfied (Step S3). In a case of determining that the in-vehicle state indicates that only the driver is satisfied (Yes in Step S3), the ECU 19 calculates the first driving characteristics in such a manner that the degrees of steepness and slowness are set for each of the various items of the driving characteristics as illustrated in FIG. 3, and stores the calculated first driving characteristics in the storage unit 17 (Step S4). Then, the ECU 19 ends the series of control. On the other hand, in a case of determining that the in-vehicle state indicates that only the driver is not satisfied, that is, the occupant other than the driver is present in the processing of Step S3 (No in Step S3), the ECU 19 learns the preference of the driver from traveling data during the manual driving, calculates the second driving characteristics in such a manner that the degrees of steepness and slowness are set for each of the various items of the driving characteristics as illustrated in FIG. 3, and stores the calculated second driving characteristics in the storage unit 17 (Step S5). Then, the ECU 19 ends the series of control.

Furthermore, in a case where the ECU 19 determines that the manual driving is not performed, that is, the automatic driving is performed in the processing of Step S1 (No in Step S1), the setting of the driving characteristics during the autonomous driving is updated (Step S6). Then, the ECU 19 determines whether to utilize the manual driving-based characteristics, that is, the first driving characteristics or the second driving characteristics (Step S7). In a case of determining that the manual driving-based characteristics is not utilized (No in Step S7), the ECU 19 applies default driving characteristics for the automatic driving which characteristics is stored in advance in the storage unit 17, and ends the series of control. On the other hand, in a case where it is determined to utilize the manual driving-based characteristics in the processing of Step S7 (Yes in Step S7), the psychological state of the occupant or the drive mode is updated (Step S8). Then, the ECU 19 determines whether the psychological state of the occupant indicates being in hurry or sporty is satisfied (Step S9). In a case of determining that the psychological state of the occupant indicates being in hurry or sporty is satisfied (Yes in Step S9), the ECU 19 applies the first driving characteristics that is the manual driving-based characteristics (Step S10). Then, the ECU 19 ends the series of control. Furthermore, in a case of determining that the psychological state of the occupant indicates being in hurry or sporty is not satisfied in the processing of Step S9 (No in Step S9), the ECU 19 applies the second driving characteristics that is the manual driving-based characteristics (Step S11). Then, the ECU 19 ends the series of control.

As described above, the ECU 19 reflects the first driving characteristics and the second driving characteristics, which are learned values learned with the state of the occupant other than the driver during the manual driving and the driving characteristics during the manual driving being associated, on the control of the automatic driving. As a result, it is possible to perform the automatic driving comfortable for the occupant with the driving characteristics in which the state of the occupant is considered.

Note that the presence or absence of the occupant other than the driver has been described as the in-vehicle state for which the manual driving-based characteristics is to be individually stored. However, even in the second in-vehicle state in which the occupant other than the driver is present during the manual driving, rough driving is likely to be performed in a case where the psychological state of the driver is in a hurry or desires sporty driving. Thus, it is desirable that a learned value that is learned in a case where the psychological state of the driver is being in hurry or sporty in the second in-vehicle state during the manual driving is not reflected on the second driving characteristics as the manual driving-based characteristics. In addition, the learned value that is learned in a case where the psychological state of the driver is being in hurry or sporty in the second in-vehicle state during the manual driving may be stored as the first driving characteristics. Then, in a case where the setting of the driving characteristics is updated during the automatic driving and the manual driving-based characteristics (first driving characteristics and second driving characteristics) are utilized, the first driving characteristics or the second driving characteristics may be applied on the basis of the psychological state of the occupant.

Figure 4:
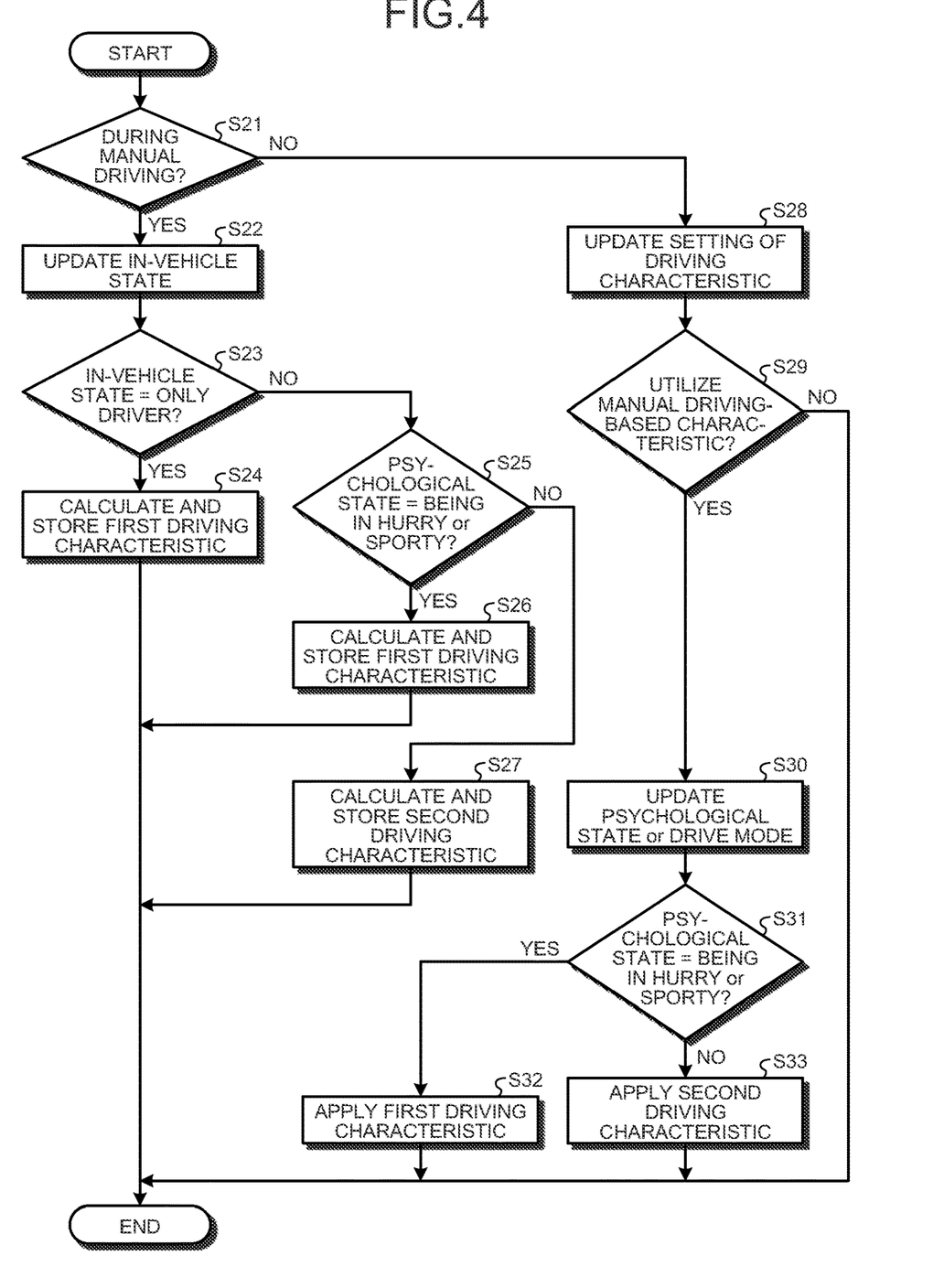
FIG. 4 is a flowchart illustrating a second example of control performed by the ECU.

FIG. 4 is a flowchart illustrating a second example of the control performed by the ECU 19. Note that a control flow illustrated in FIG. 4 is repeatedly executed every several milliseconds, for example.

First, the ECU 19 determines whether manual driving is being performed (Step S21). In a case of determining that the manual driving is being performed (Yes in Step S21), the ECU 19 updates a state inside the vehicle (Step S22). Then, the ECU 19 determines whether an in-vehicle state indicates that only a driver is satisfied (Step S23). In a case of determining that the in-vehicle state indicates that only the driver is satisfied (Yes in Step S23), the ECU 19 learns preference of the driver from traveling data during the manual driving, calculates first driving characteristics in such a manner that degrees of steepness and slowness are set for each of various items of driving characteristics, and stores the calculated first driving characteristics in the storage unit 17 (Step S24). Then, the ECU 19 ends the series of control. On the other hand, in a case of determining that the in-vehicle state indicates that only the driver is not satisfied, that is, an occupant other than the driver is present in the processing of Step S23 (No in Step S23), the ECU 19 determines whether a psychological state of the occupant indicates being in hurry or sporty (Step S25). In a case of determining that the psychological state of the occupant indicates being in hurry or sporty is satisfied (Yes in Step S25), the ECU 19 learns the preference of the driver from the traveling data during the manual driving, calculates the first driving characteristics in such a manner that the degrees of steepness and slowness are set for each of the various items of the driving characteristics, and stores the calculated first driving characteristics in the storage unit 17 (Step S26). Then, the ECU 19 ends the series of control. On the other hand, in a case where it is determined that the psychological state of the occupant indicates being in hurry or sporty is not satisfied in the processing of Step S25 (No in Step S25), the preference of the driver is learned from the traveling data during the manual driving, the second driving characteristics are calculated in such a manner that the degrees of steepness and slowness are set for each of the various items of the driving characteristics, and the calculated second driving characteristics are stored in the storage unit 17 (Step S27). Then, the ECU 19 ends the series of control.

Furthermore, in a case where the ECU 19 determines that the manual driving is not performed, that is, the automatic driving is performed in the processing of Step S21 (No in Step S21), setting of the driving characteristics during the automatic driving is updated (Step S28). Then, the ECU 19 determines whether to utilize the manual driving-based characteristics, that is, the first driving characteristics or the second driving characteristics (Step S29). In a case of determining that the manual driving-based characteristics is not utilized (No in Step S29), the ECU 19 applies a default driving characteristics for the automatic driving which characteristics is stored in advance in the storage unit 17, and ends the series of control. On the other hand, in a case of determining to utilize the manual driving-based characteristics in the processing of Step S29 (Yes in Step S29), the ECU 19 updates a psychological state of the occupant or a drive mode (Step S30). Then, the ECU 19 determines whether the psychological state of the occupant indicates being in hurry or sporty is satisfied (Step S31). In a case of determining that the psychological state of the occupant indicates being in hurry or sporty is satisfied (Yes in Step S31), the ECU 19 applies the first driving characteristics that is the manual driving-based characteristics (Step S32). Then, the ECU 19 ends the series of control. Furthermore, in a case of determining that the psychological state of the occupant indicates being in hurry or sporty is not satisfied in the processing of Step S31 (No in Step S31), the ECU 19 applies the second driving characteristics that is the manual driving-based characteristics (Step S33). Then, the ECU 19 ends the series of control.

As described above, even during the manual driving in the second in-vehicle state, in a case where the psychological state of the driver is being in hurry or sporty, the ECU 19 does not reflect the learned value of the driving characteristics at this time on the second driving characteristics and takes the psychological state of the driver into consideration in the learning of the driving characteristics, whereby the automatic driving more comfortable for the occupant can be performed.

Here, when the ECU 19 learns the preference of the driver from the traveling data during the manual driving and calculates the first driving characteristics and the second driving characteristics, which are the manual driving-based characteristics, in such a manner that the degrees of steepness and slowness are set for each of the various items of the driving characteristics, the degrees of steepness and slowness for each of the various items in the calculated first driving characteristics and second driving characteristics may be set to the closest level among a plurality of preset levels, and stored in the storage unit 17 as the first driving characteristics and the second driving characteristics.

Figure 5:
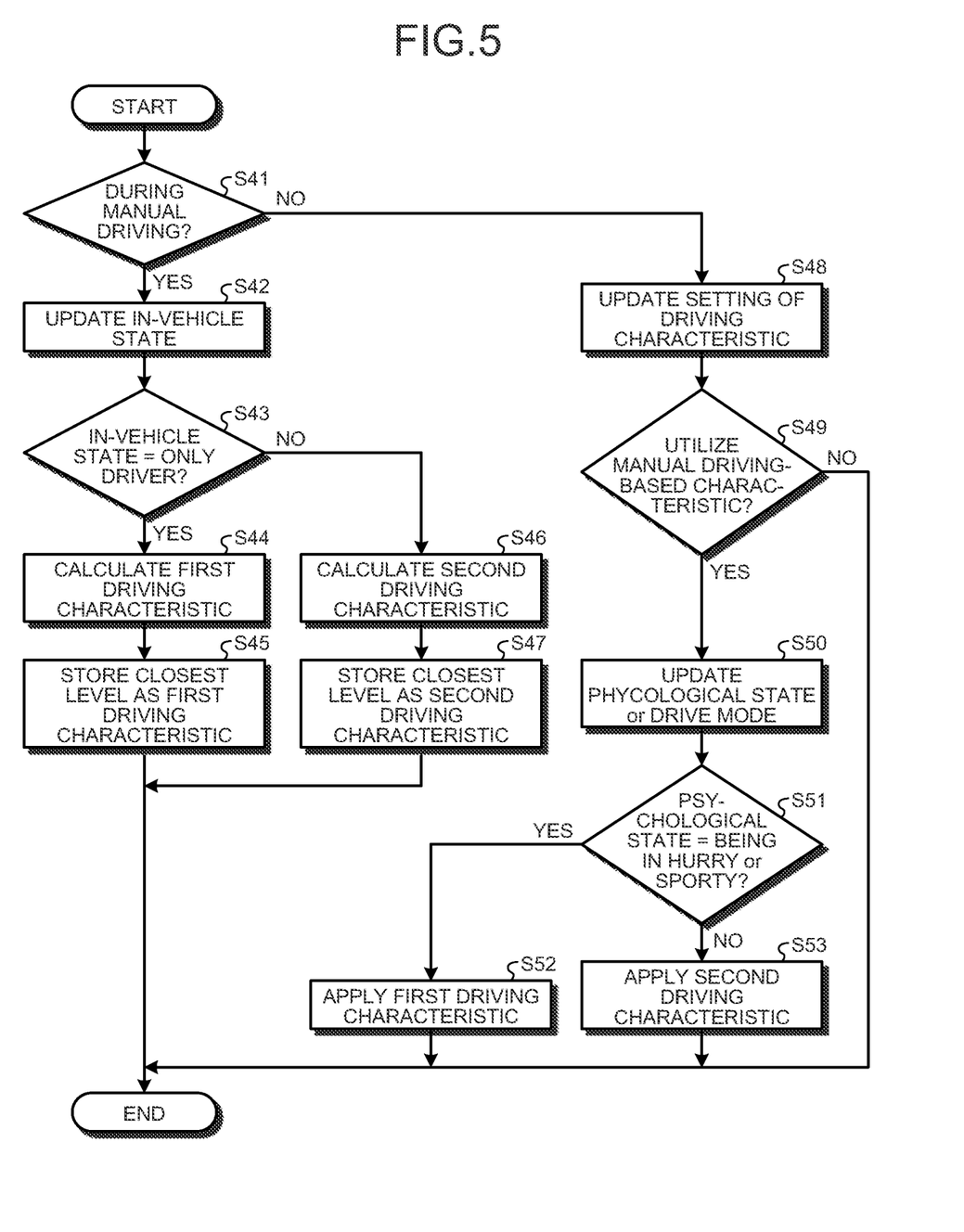
FIG. 5 is a flowchart illustrating a third example of control performed by the ECU.
Figure 6:
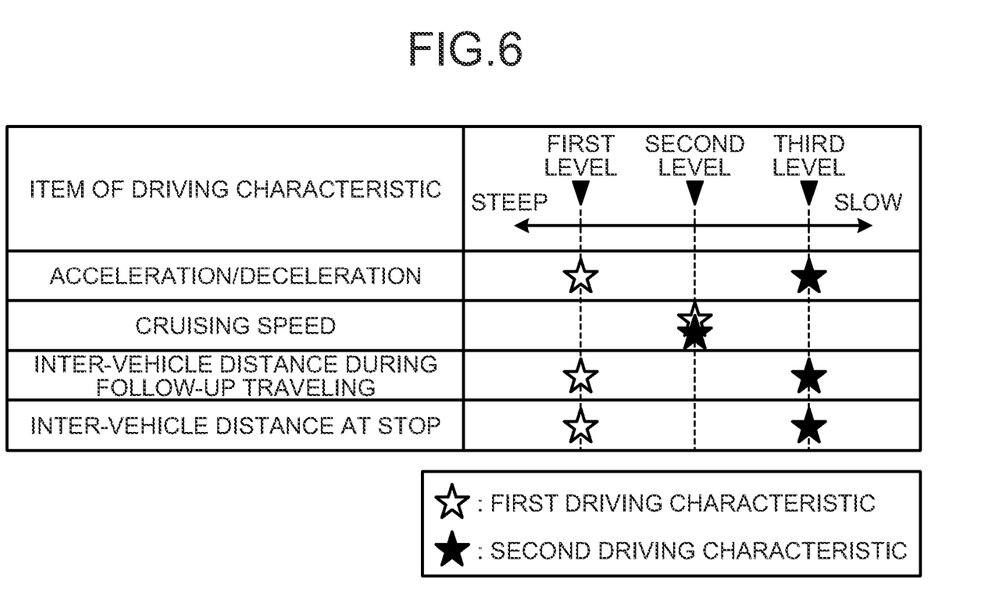
FIG. 6 is a view illustrating another example of setting of degrees of steepness and slowness for each of various items in the first driving characteristics and the second driving characteristics.

FIG. 5 is a flowchart illustrating a third example of the control performed by the ECU 19. Note that a control flow illustrated in FIG. 5 is repeatedly executed every several milliseconds, for example. FIG. 6 is a view illustrating another example of setting of degrees of steepness and slowness for each of various items in the first driving characteristics and the second driving characteristics.

First, the ECU 19 determines whether manual driving is being performed (Step S41). When determining that the manual driving is being performed (Yes in Step S41), the ECU 19 updates a state inside the vehicle (Step S42). Then, the ECU 19 determines whether an in-vehicle state indicates that only a driver is satisfied (Step S43). In a case of determining that the in-vehicle state indicates that only the driver is satisfied (Yes in Step S43), the ECU 19 calculates the first driving characteristics in such a manner that the degrees of steepness and slowness are set for each of the various items of the driving characteristics (Step S44). Then, the ECU 19 sets the degrees of steepness and slowness for each of the various items in the calculated first driving characteristics to the closest level among a first level, a second level, and a third level as illustrated in FIG. 6, and stores the level in the storage unit 17 as the first driving characteristics (Step S45). Then, the ECU 19 ends the series of control. On the other hand, in a case of determining that the in-vehicle state indicates that only the driver is not satisfied, that is, an occupant other than the driver is also present in the processing of Step S43 (No in Step S43), the ECU 19 learns the preference of the driver from the traveling data during the manual driving, and calculates the second driving characteristics in such a manner that the degrees of steepness and slowness are set for each of the various items of the driving characteristics (Step S46). Then, the ECU 19 sets the degrees of steepness and slowness for each of the various items in the calculated second driving characteristics to the closest level among the first level, the second level, and the third level as illustrated in FIG. 6, and stores the level in the storage unit 17 as the second driving characteristics (Step S47). Then, the ECU 19 ends the series of control.

Furthermore, in a case where the ECU 19 determines that the manual driving is not performed, that is, the automatic driving is performed in the processing of Step S41 (No in Step S41), setting of the driving characteristics during the automatic driving is updated (Step S48). Then, the ECU 19 determines whether to utilize the manual driving-based characteristics, that is, the first driving characteristics or the second driving characteristics (Step S49). In a case of determining that the manual driving-based characteristics is not utilized (No in Step S49), the ECU 19 applies a default driving characteristics for the automatic driving which characteristics is stored in advance in the storage unit 17, and ends the series of control. On the other hand, in a case where it is determined to utilize the manual driving-based characteristics in the processing of Step S49 (Yes in Step S49), the psychological state of the occupant or the drive mode is updated (Step S50). Then, the ECU 19 determines whether the psychological state of the occupant indicates being in hurry or sporty is satisfied (Step S51). In a case of determining that the psychological state of the occupant indicates being in hurry or sporty is satisfied (Yes in Step S51), the ECU 19 applies the first driving characteristics that is the manual driving-based characteristics (Step S52). Then, the ECU 19 ends the series of control. Furthermore, in a case of determining that the psychological state of the occupant indicates being in hurry or sporty is not satisfied in the processing of Step S51 (No in Step S51), the ECU 19 applies the second driving characteristics that is the manual driving-based characteristics (Step S53). Then, the ECU 19 ends the series of control.

As a result, when the preference of the driver is learned from the traveling data during the manual driving in the first in-vehicle state or the second in-vehicle state, even when there are some variations in the degrees of steepness and slowness for each of the various items of the driving characteristics in similar traveling situations, it is possible to prevent the driving characteristics during the automatic driving from being greatly changed each time the setting of the driving characteristics during the automatic driving is updated, and to perform the automatic driving more comfortable for the occupant.

Note that as the in-vehicle state for which the ECU 19 is to individually set the manual driving-based characteristics, there is a difference in a seated state, or the like of the occupant. Thus, for example, an in-vehicle state in which only the driver is present may be set as a first in-vehicle state, an in-vehicle state in which an occupant other than the driver is present and the occupant is seated in a manner of facing forward may be set as a second in-vehicle state, an in-vehicle state in which an occupant other than the driver is present and the occupant is seated in a manner of facing backward may be set as a third in-vehicle state, and an in-vehicle state in which an occupant other than the driver is present and the occupant is on board in a standing position may be set as a fourth in-vehicle state. Then, as compared with a driving characteristics learned in the first in-vehicle state, driving characteristics learned in the second in-vehicle state, the third in-vehicle state, and the fourth in-vehicle state become slow (dull) driving characteristics that concern the occupant. In addition, in the second in-vehicle state and the third in-vehicle state, directions of force applied to the occupant at the time of acceleration and deceleration are opposite. Thus, by treating these in-vehicle states as different in-vehicle states, it is possible to set driving characteristics that reflects the preference of the driver more. Note that it is preferable that the fourth in-vehicle state is excluded in a case where boarding in the standing position is not possible. Furthermore, with respect to first driving characteristics, second driving characteristics, third driving characteristics, and fourth driving characteristics acquired as the manual driving-based characteristics by learning of the preference of the driver from the traveling data during the manual driving in the first in-vehicle state, the second in-vehicle state, the third in-vehicle state, and the fourth in-vehicle state, corresponding driving characteristics may be selected on the basis of the in-vehicle state during the automatic driving. In addition, it is preferable to correct the manual driving-based characteristics on the basis of sex, age, and health information of the occupant other than the driver.

The vehicle control device according to the present disclosure has an effect of being able to perform the automatic driving comfortable for the occupant other than the driver by reflecting the learned value of the driving characteristics, in which value the state of the occupant other than the driver during the manual driving is considered, on the control of the automatic driving.

According to an embodiment, the learned value of the driving characteristics in consideration of the state of the occupant other than the driver during the manual driving is reflected on the control of the automatic driving, and it is possible to perform the automatic driving comfortable for the occupant other than the driver.

According to an embodiment, it is possible to realize the smooth automatic driving that concerns the occupant other than the driver while reflecting preference of the driver in driving on the driving characteristics.

According to an embodiment, it is possible to realize the automatic driving comfortable for the occupant.

According to an embodiment, even during the manual driving in the second in-vehicle state, in a case where a psychological state of the driver is being in hurry or the like, the learned value of the driving characteristics at this time is not reflected, and the psychological state of the driver is taken into consideration in the learning of the driving characteristics, whereby the automatic driving more comfortable for the occupant can be performed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device for controlling a vehicle, the vehicle control device being configured to switch between automatic driving and manual driving of the vehicle, learn driving characteristics during the manual driving, and reflect a learned value of the driving characteristics in control during the automatic driving, wherein
   the vehicle control device controls the vehicle in a manner that, in the learned value of the driving characteristics, a state of an occupant other than a driver during the manual driving is in association with the driving characteristics,
   the state of the occupant other than the driver during the manual driving includes at least presence or absence of the occupant other than the driver,
   an in-vehicle state in which only the driver is present is set as a first in-vehicle state, and an in-vehicle state in which the occupant other than the driver is also present is set as a second in-vehicle state,
   the learned value of the driving characteristics is set in such a manner that the second in-vehicle state has a slower driving characteristics than the first in-vehicle state,
   in each of a first driving characteristics and a second driving characteristics, the first driving characteristics corresponding to the learned value of the driving characteristics obtained by learning in the first in-vehicle state during the manual driving, the second driving characteristics corresponding to the learned value of the driving characteristics obtained by learning in the second in-vehicle state during the manual driving, degrees of steepness and slowness for a plurality of items are set to a closest level among a plurality of preset levels,
   the plurality of preset levels comprise a first level, a second level, and third level, the first level having a largest degree of steepness and slowness and the third level having a smallest degree of steepness and slowness,
   a psychological state of the driver and a psychological state of the occupant other than a driver is further in association with the learned value of the driving characteristics, the psychological state, and
   the psychological state of the driver or the psychological state of the occupant other than the driver is based on information that is read from a face of the driver or a face of the occupant other than a driver by a sensor group.

2. The vehicle control device according to claim 1, wherein the plurality of items comprise at least one of acceleration/deceleration, cruising speed, inter-vehicle distance during follow-up traveling, inter-vehicle distance at stop, acceleration and jerk during acceleration/deceleration, acceleration/deceleration start timing, longitudinal acceleration at starting, corner entry vehicle speed, lateral acceleration at a corner, track at the corner, or lateral acceleration at a time of lane change.

3. The vehicle control device according to claim 1, wherein the psychological state of the driver or the psychological state of the occupant other than the driver is based on information of a conversation sensed by the sensor group.

* * * * *